US008902721B1

(12) United States Patent
Oberg

(10) Patent No.: US 8,902,721 B1
(45) Date of Patent: *Dec. 2, 2014

(54) METHOD AND DEVICE FOR DETECTING A DATA PATTERN IN DATA BITS

(71) Applicant: Marvell International Ltd., Hamilton (BM)

(72) Inventor: Mats Oberg, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/161,216

(22) Filed: Jan. 22, 2014

Related U.S. Application Data

(63) Continuation of application No. 13/716,676, filed on Dec. 17, 2012, now Pat. No. 8,644,121, which is a continuation of application No. 12/359,855, filed on Jan. 26, 2009, now Pat. No. 8,358,566, which is a continuation-in-part of application No. 11/775,119, filed on Jul. 9, 2007, now Pat. No. 8,582,409.

(60) Provisional application No. 61/025,119, filed on Jan. 31, 2008, provisional application No. 60/830,630, filed on Jul. 13, 2006.

(51) Int. Cl.
*G11B 5/09* (2006.01)
*G11B 7/007* (2006.01)

(52) U.S. Cl.
CPC .................................. *G11B 7/00736* (2013.01)
USPC ......................................... 369/47.48; 375/354

(58) Field of Classification Search
None
See application file for complete search history.

(56) References Cited

U.S. PATENT DOCUMENTS

| | | |
|---|---|---|
| 5,533,003 A | 7/1996 | Kobayashi |
| 5,699,106 A | 12/1997 | Matsubara et al. |
| 5,729,396 A | 3/1998 | Dudley et al. |
| 5,793,548 A | 8/1998 | Zook |
| 5,907,446 A | 5/1999 | Ishii et al. |
| 6,263,469 B1 | 7/2001 | Jang |
| 6,369,969 B1 | 4/2002 | Christiansen et al. |
| 6,396,998 B1 | 5/2002 | Nozaki et al. |
| 6,529,459 B1 | 3/2003 | Lebowsky |
| 6,603,622 B1 | 8/2003 | Christiansen et al. |
| 6,639,748 B1 | 10/2003 | Christiansen et al. |
| 6,657,802 B1 | 12/2003 | Ashley et al. |
| 7,054,398 B1 | 5/2006 | Wu et al. |
| 7,391,583 B1 | 6/2008 | Sheh et al. |
| 7,466,782 B1 | 12/2008 | Patapoutian |
| 7,881,164 B1 * | 2/2011 | Han et al. .................. 369/44.11 |
| 2002/0150179 A1 | 10/2002 | Leis et al. |
| 2003/0193614 A1 | 10/2003 | Holland et al. |

(Continued)

OTHER PUBLICATIONS

Suzuki, et al., "A Newly Developed Single-chip LSI for HD DVD/DVD/CD," IEEE Transactions on Consumer Electronics, vol. 52, No. 1, Feb. 2006.

(Continued)

*Primary Examiner* — Brenda Bernardi

(57) ABSTRACT

A method and device for determining frequency error to extend the pull-in range of a timing recovery circuit for a storage device such as an optical disc drive. A code associated with a storage format of the storage device is detected, and the distance between occurrences of the code is determined. The calculated distance is compared with the expected distance to determine the difference. Based on the difference, the frequency error is determined.

20 Claims, 14 Drawing Sheets

(56) References Cited

U.S. PATENT DOCUMENTS

| | | |
|---|---|---|
| 2003/0206722 A1 | 11/2003 | Tanaka et al. |
| 2003/0233197 A1 | 12/2003 | Padilla et al. |
| 2004/0017996 A1 | 1/2004 | Yamaguchi |
| 2004/0163116 A1 | 8/2004 | Taira et al. |
| 2005/0163274 A1* | 7/2005 | Ito ................................. 375/365 |
| 2005/0270937 A1 | 12/2005 | Lee et al. |
| 2006/0212780 A1 | 9/2006 | Ohira et al. |
| 2006/0233286 A1 | 10/2006 | Annampedu et al. |
| 2007/0172008 A1* | 7/2007 | Shine ............................. 375/368 |
| 2008/0144463 A1 | 6/2008 | Ueki |
| 2009/0046820 A1 | 2/2009 | Clark et al. |

OTHER PUBLICATIONS

ECMA-330 3rd Edition, Jun. 2004, 120 mm (4,7 Gbytes per side) and 80 mm (1,46 Gbytes per side) DVD Rewritable Disk (DVD-RAM).

* cited by examiner

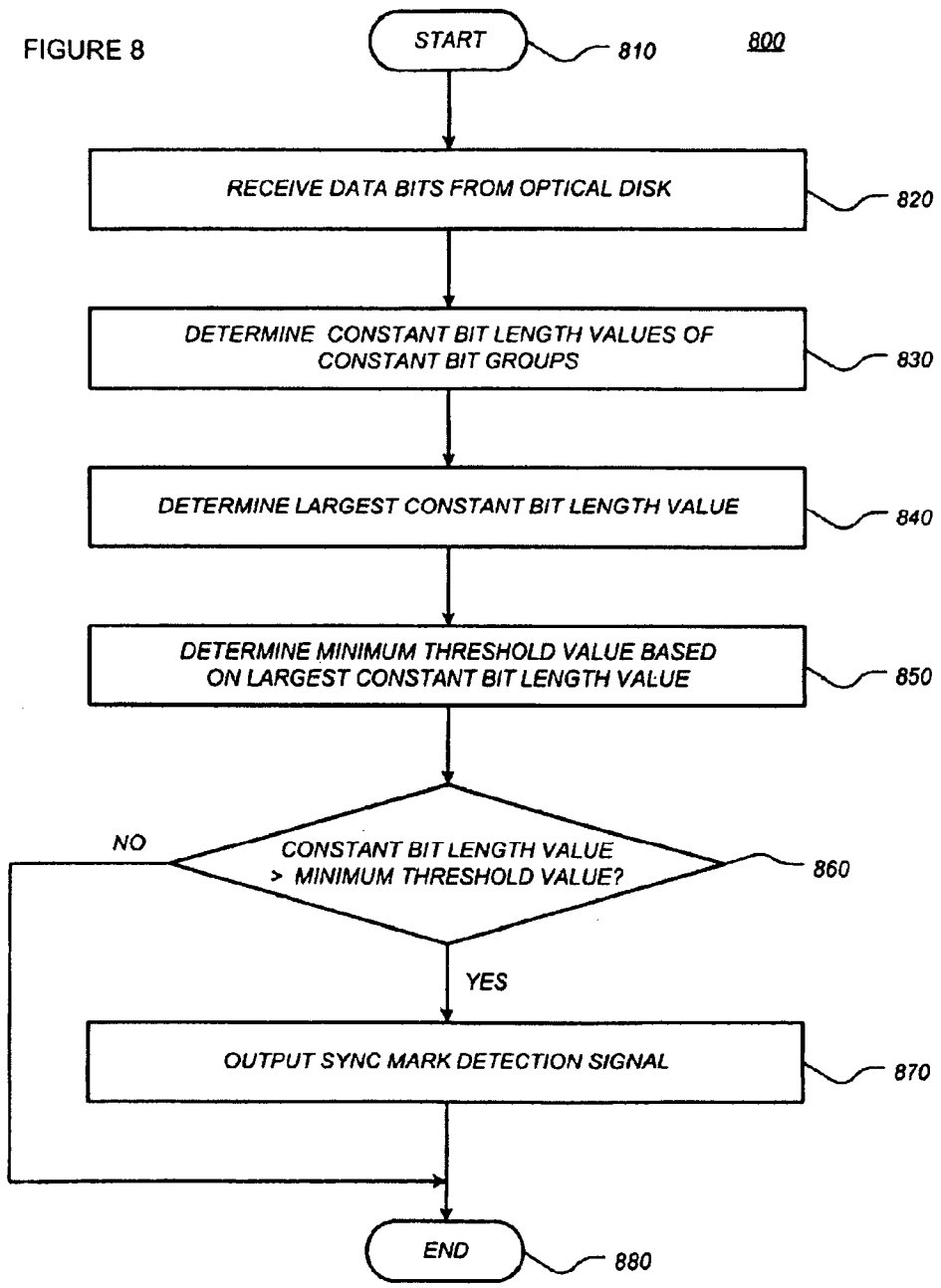

METHOD AND DEVICE FOR DETECTING A DATA PATTERN IN DATA BITS

This is a Continuation of application Ser. No. 13/716,676, filed Dec. 17, 2012, which is a Continuation of application Ser. No. 12/359,855, now issued as U.S. Pat. No. 8,358,566, filed Jan. 26, 2009, which claims the benefit of U.S. Provisional Application No. 60/830,630, filed Jul. 13, 2006, U.S. application Ser. No. 11/775,119, now issued as U.S. Pat. No. 8,582,409, filed Jul. 9, 2007, and U.S. Provisional Application No. 61/025,119, filed Jan. 31, 2008. The disclosure of the prior applications is hereby incorporated by reference herein in its entirety.

BACKGROUND OF THE INVENTION

1. Field of the Invention

The invention is directed generally to aiding frequency acquisition and, more particularly, to a method and device to extend the pull-in range of a timing recovery circuit for a storage device, such as an optical disc drive.

2. Related Art

Storage devices, such as disc drives and optical storage drives, use a spindle motor to rotate the storage disc. To ensure that information from the storage disc is obtained, it is necessary to know the rotational speed to correlate the data frequency of the storage disc.

One known method for obtaining the frequency includes moving a laser reading head to a hub of the storage disc and moving it back to a certain radius. Based on known radius and rotational speed, the data frequency can be estimated. However, this results in only an estimate of the frequency, and the error rate may be as high as 10% or even higher in some cases.

To account for this error, timing loop correction circuits have been employed to attempt to correct the error and pull-in the detected frequency so that the error is sufficiently small. However, known timing loop correction circuits may suffer from the problem with not being able to pull-in errors of relatively larger corrections. By way of example, a timing loop correction circuit may only be able to pull-in a frequency error of about 0.5%. If the frequency error is greater, the storage device may be unable to lock in the frequency and access the data. Accordingly, it would be desirable to provide improved frequency error pull-in for storage devices and, in particular, for optical storage drives.

SUMMARY OF THE INVENTION

The invention avoids the drawbacks and disadvantages of the prior art through a frequency detection scheme employing the known distances between codes used on the storage media, such as sync codes, wobble sync marks, headers for DVD-RAM, and similar repeating signals (collectively referred to herein as "sync codes"). In particular, as described herein, the frequency detector of the invention compares an actual distance between sync code occurrences and an expected distance between sync code occurrences to determine the frequency error, which is then used to control the motor that rotates the media.

The invention may be implemented in a number of ways. According to one aspect of the invention a timing recovery circuit for a storage device having rotating storage media includes a frequency detector to detect a frequency offset based on a code associated with the storage media and generate an output, and a timing control circuit responsive to the output of the frequency detector that controls a clock generator to generate a clock that may be in synchronization with a signal read from the storage media.

The frequency detector may be programmable based upon a format of the code associated with the storage media. The frequency detector further may include a code detector responsive to an input signal based upon the frequency of the code, a counter responsive to an output of the code detector to output a code distance count, and a frequency error generator responsive to the output of the counter to generate a frequency error signal. The frequency error generator further may include a summer subtracting an expected code distance count from the code distance count to generate a code distance count difference, and a multiplier to generate a normalized sync code distance count difference. The multiplier may divide the code distance count difference by the expected code distance count and the normalized sync code difference may be the frequency error. The frequency error generator further may include a comparator to compare the normalized sync code distance count difference with a threshold value and generate an output, and a multiplexer responsive to the output of the comparator to transmit the normalized sync code distance count difference to a timing loop. The frequency error generator further may include a comparator to compare the sync code distance count difference with a threshold value and generate an output, and a multiplexer responsive to the output of the comparator to transmit a normalized sync code distance count difference to the timing loop. The threshold value may be programmable. The circuit may include an absolute value module receiving the normalized sync code distance count difference and generating an absolute value of the normalized sync code distance count difference. The code distance count difference may be the number of clock cycles between the occurrences of the code. The expected code distance count may be programmable. The counter further may include a clock counter responsive to the frequency detection of a code event, the clock counter outputting a signal indicative of the number of clock cycles between the occurrences of the code events, and a comparator operatively connected to the clock counter to receive the signal from the clock counter, the comparator may compare the signal from the clock counter to a threshold and outputting a comparator signal based on the comparison. The circuit may include a first scaler responsive to the frequency detector to scale the output of the frequency detector by a frequency control gain. The circuit may include a timing loop that includes an accumulator responsive to the first scaler. The circuit may include a motor detector that may include a phase detector, and the timing loop further may include second and third scalers responsive to the phase detector to scale an output of the phase detector by a phase update gain and a frequency update gain, respectively. The circuit may include a summer responsive to one of the second and third scalers and the accumulator to generate the frequency acquisition signal. The code associated with the storage media may include a code selected from the group consisting of sync codes, wobble sync marks and headers. The clock generator may include a VCO.

According to another aspect a timing recovery method for a storage device having rotating storage media includes the steps of detecting a frequency offset based on a code associated with the storage media and generating an output, and controlling timing responsive to the frequency offset to generate a clock that may be in synchronization with a signal read from the storage media.

The method may include the step of programming the frequency detection based upon a format of the code associated with the storage media. The frequency detecting step further may include detecting a code responsive to an input signal based upon the frequency of the code, outputting a code distance count, and generating a frequency error signal. The step of generating a frequency error signal may include the steps of subtracting an expected code distance count from the code distance count to generate a code distance count difference, and generating a normalized sync code distance count difference. The step of generating further may include dividing the code distance count difference by the expected code distance count and wherein the normalized sync code difference may be the frequency error. The step of generating further may include comparing the normalized sync code distance count difference with a threshold value and generating an output, and transmitting the normalized sync code distance count difference to a timing loop. The step of generating may further include comparing the sync code distance count difference with a threshold value and generating an output, and transmitting a normalized sync code distance count difference to the timing loop. The method may include the step of programming the threshold value. The method may include the step of receiving the normalized sync code distance count difference and generating an absolute value of the normalized sync code distance count difference. The code distance count difference may be the number of clock cycles between the occurrences of the code. The method may include the step of programming the expected code distance count. The method may include the step of scaling the output by a frequency control gain. The code associated with the storage media may include a code selected from the group consisting of sync codes, wobble sync marks and headers.

In yet another aspect of the invention a timing recovery circuit for a storage device having rotating storage media that includes means for detecting a frequency offset based on a code associated with the storage media and generating an output, and means for controlling timing responsive to the frequency offset to generate a clock that is in synchronization with a signal read from the storage media.

The frequency detecting means may be programmable based upon a format of the code associated with the storage media. The frequency detecting means further may include means for detecting a code responsive to an input signal based upon the frequency of the code, means for outputting a code distance count, and means for generating a frequency error signal. The generating means may further include means for subtracting an expected code distance count from the code distance count to generate a code distance count difference, and means for multiplying to generate a normalized sync code distance count difference. The multiplying means further may include means for dividing the code distance count difference by the expected code distance count and wherein the normalized sync code difference may be the frequency error. The generating means further may include means for comparing the normalized sync code distance count difference with a threshold value and for generating an output, and means for multiplexing responsive to the output of the comparing means to transmit the normalized sync code distance count difference to the timing loop. The generating means further may include means for comparing the sync code distance count difference with a threshold value and generate an output, and means for multiplexing responsive to the output of the comparing means to transmit a normalized sync code distance count difference to the timing loop. The threshold value may be programmable. The circuit may include means for generating an absolute value receiving the normalized sync code distance count difference and generating an absolute value of the normalized sync code distance count difference. The code distance count difference may be the number of clock cycles between the occurrences of the code. The expected code distance count may be programmable. The outputting means further may include means for clock counting responsive to the frequency detection of a code event, the clock counting means outputting a signal indicative of the number of clock cycles between the occurrences of the code events, and means for comparing operatively connected to the clock counting means to receive the signal from the clock counting means, the comparing means comparing the signal from the clock counting means to a threshold and outputting a signal based on the comparison. The circuit may include a first scaler responsive to the frequency detecting means to scale the output of the frequency detecting means by a frequency control gain. The circuit may include a timing loop that includes means for accumulating responsive to the first scaler. The circuit may include means for detecting a motor comprising a phase detector and the timing loop further may include second and third scalers responsive to the phase detector to scale an output of the phase detector by a phase update gain and a frequency update gain, respectively. The circuit may include a summer responsive to one of the second and third scalers and the accumulator to generate the frequency acquisition signal. The code associated with the storage media may include a code selected from the group consisting of sync codes, wobble sync marks and headers. The clock generator may include a VCO.

In yet another aspect of the invention, a method of detecting a sync mark in data bits, includes receiving a constant bit group that includes a plurality of consecutive data bits of a same logic value; determining a constant bit length value that is representative of a length of the constant bit group; comparing the constant bit length value to a largest previous constant bit length value to determine a largest constant bit length value; determining a threshold value based on the largest constant bit length value; and outputting a sync mark detection signal when the constant bit length value is larger than the threshold value.

In yet another aspect of the invention, a sync mark detector includes an input terminal configured to receive a constant bit groups including a plurality of consecutive data bits of a same logic value; a first unit configured to sequentially output a constant bit length value that is representative of a length of the constant bit group; a second unit configured to compare the constant bit length value to a largest previous constant bit length value to determine a largest constant bit length value and to determine a threshold value based on the largest constant bit length value; and a third unit configured to output a sync mark detection signal when an individual constant bit length value is larger than the threshold value.

In yet another aspect of the invention, a method is provided for detecting a sync mark in data bits, the sync mark having a predetermined bit length. The method includes receiving a constant bit group having a plurality of consecutive bits having a same logic value; comparing length information of the constant bit group to that of a longest previous constant bit group to determined length information of a longest constant bit group; determining a threshold value based on the length information of the longest constant bit group; comparing the length information of the constant bit group to the threshold value; and generating a sync detection signal when the length information of the constant bit group is larger than the threshold value.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIG. 8 shows a process for detecting a sync mark in data bits, according to the principles of the invention.

DETAILED DESCRIPTION OF THE INVENTION

Figure 1:
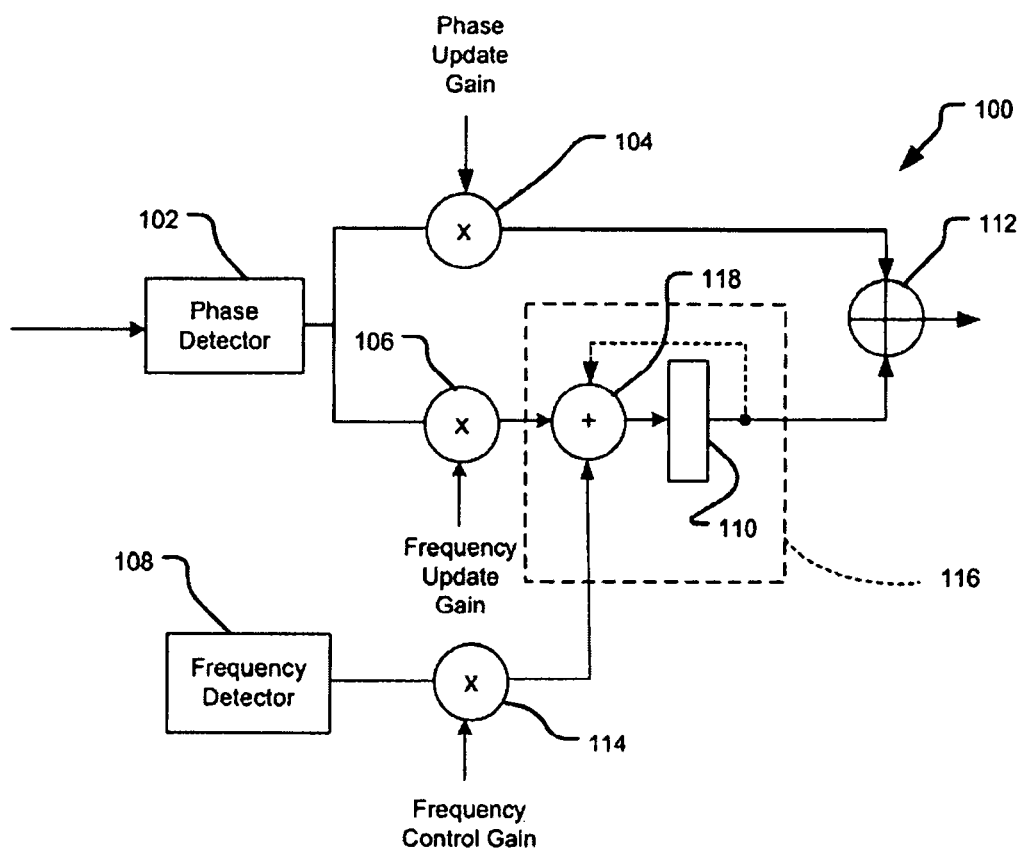
FIG. 1 shows an exemplary embodiment of a timing loop circuit having a frequency detector constructed according to the principles of the invention.

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

According to principles of the invention, a frequency detector scheme is employed to aid in a frequency acquisition circuit for storage devices such as optical storage, but a skilled artisan will appreciate that the principles of the invention may be employed in other storage devices having storage media rotating at high frequencies and similar devices. This implementation may significantly extend the pull-in range of the timing recovery loop. Storage discs have different storage formats that include various types of periodic repeating signals, such as the sync codes referred to above. Depending on the format of the storage disc and different operational modes, the frequency detector can use the known distance between sync codes associated with the storage disc formats to detect errors. The frequency offset can then be estimated using the known distance between the detected sync codes. The estimated frequency offset can be multiplied by a gain factor and added to a frequency accumulator of the timing recovery loop to control the frequency of the channel lock and hence keep synchronized with the frequency of the RF signal. The principles of the invention are described in greater detail with respect to the exemplary embodiments described below.

FIG. 1 shows an exemplary embodiment of a timing loop circuit 100 having a frequency detector 108 constructed according to the principles of the invention. The timing loop circuit 100 is a feedback circuit that controls the generation of the channel clock based upon the detected error in frequency. The timing loop circuit 100 includes a phase detector 102, frequency detector 108, frequency accumulator 116 and a clock generator, e.g. a voltage controlled oscillator (VCO) (which is not shown here), as further described below.

The phase detector 102 detects the phase of the received signal and outputs a phase detector output signal, such as, a timing error signal that is branched over two lines. In the first branch, the phase detector output signal may be scaled with a phase update gain at a combiner 104, which may be a multiplier circuit that multiplies the signal by the phase update gain. In the second branch, the phase detector output signal may be scaled by a frequency update gain at combiner 106, which also may be a multiplier circuit.

The frequency detector 108 aids in frequency acquisition in the timing loop circuit 100. The output of the frequency detector 108 may be scaled by a frequency control gain using a combiner 114, such as a multiplier circuit, and combined with the output of combiner 106 in the timing loop circuit 100 by combiner 118, such as a summing circuit. The use of frequency detector 108 in the timing loop circuit 100 can extend the pull-in range of the timing loop. More specifically, the output from combiner 114 is combined with the output of combiner 106 in frequency accumulator 116. The frequency accumulator 116 includes the combiner 118 and delay component 110. The output of combiner 118 is delayed by delay component 110. The output of the delay component 110 is fed back into combiner 118. The output from the frequency accumulator 116 is combined with the output from combiner 104 at another combiner 112, such as a summing circuit. The output of combiner 112 is then sent to a VCO, or other means for clock generation, to generate the clock controlling the ADC.

Figure 2:
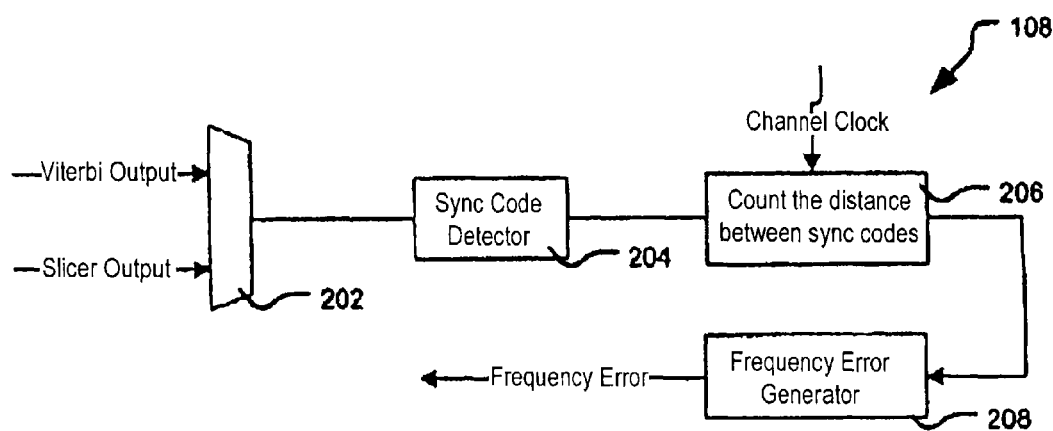
FIG. 2 shows an exemplary frequency detector constructed according to the principles of the invention, which may be used in connection with the timing loop circuit shown in FIG. 1.

FIG. 2 shows an exemplary frequency detector constructed according to the principles of the invention, which may be used in connection with the timing loop shown in FIG. 1. In particular FIG. 2 shows one embodiment of the sync code distance based frequency detector 108 of the invention. The frequency detector 108 may include a multiplexer 202, a sync code detector 204, a counter 206 and a frequency error generator 208. The sync codes on the storage media may be detected using one or more detectors, such as a Viterbi detector and/or a slicer detector and/or a decision feedback equalizer and/or a correlation detector, which are coupled to the read head of a storage drive, as is known in the art. The output from the Viterbi and/or slicer detectors is received at a multiplexer 202. A VIT_OR_SLICER controls which signal to use. For the slicer output, a limit equalizer (not shown) positioned before the slicer may be used to equalize the signal.

The sync code detector 204 is responsive to the output of the multiplexer 202. The sync code detector 204 may be a match finder that detects a signal output from the multiplexer 202 and determines when a match for a specific sync code occurs. According to an embodiment of the invention, the sync code detector 204 may be programmable to permit the detection of different types of sync codes. Different storage formats, such as CD, DVD, Blu-ray or HD DVD, use different types of sync codes and different distances between the sync codes. Therefore, the sync code detector 204 may be programmable to allow the frequency detector 108 to be used with different storage devices.

The counter 206 is responsive to the output from sync code detector 204. The output from sync code detector 204 indicates whether a sync code occurrence has been detected. Using a channel clock signal, the counter 206 determines the distance between the detected sync codes. This distance may be expressed by the number of clock cycles between occurrences of the sync codes or the like, as a skilled artisan would appreciate. A frequency offset may be estimated from the distance between the detected sync codes by the frequency error generator 208. As described above, the estimated frequency offset can be multiplied with the frequency control gain by combiner 114 and the result is then provided to the frequency accumulator 116.

Thus, the frequency error generator 208 receives the output from counter 206, and generates a frequency offset, which is input to combiner 114.

Figure 2A:
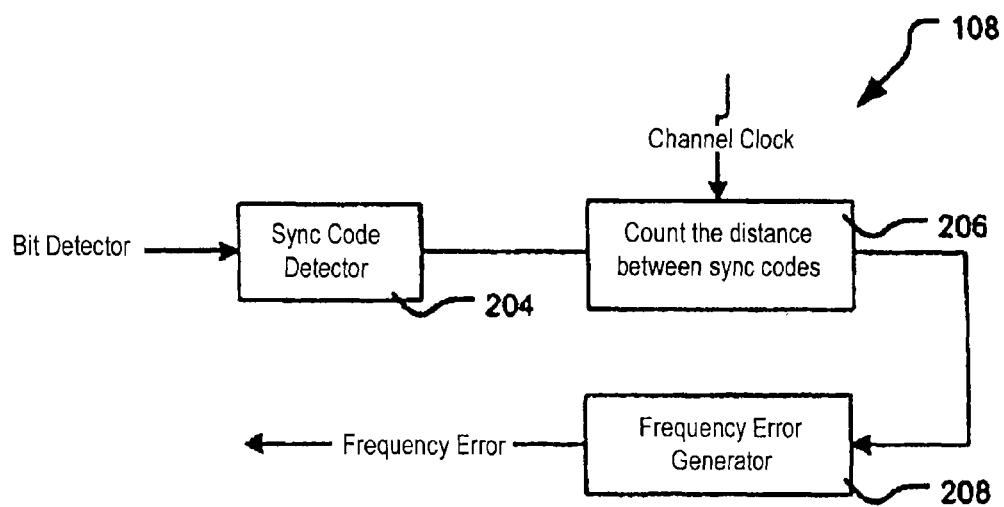
FIG. 2A shows another exemplary frequency detector constructed according to the principles of the invention, which may be used in connection with the timing loop circuit shown in FIG. 1.

FIG. 2A shows another exemplary frequency detector constructed according to the principles of the invention, which may be used in connection with the timing loop circuit shown in FIG. 1. More specifically, in the FIG. 2A aspect, the sync codes on the storage media may be detected using a bit detector, such as a Viterbi detector and/or a slicer detector and/or a decision feedback equalizer and/or a correlation detector, which are coupled to the read head of the storage drive, as is known in the art.

Figure 2B:
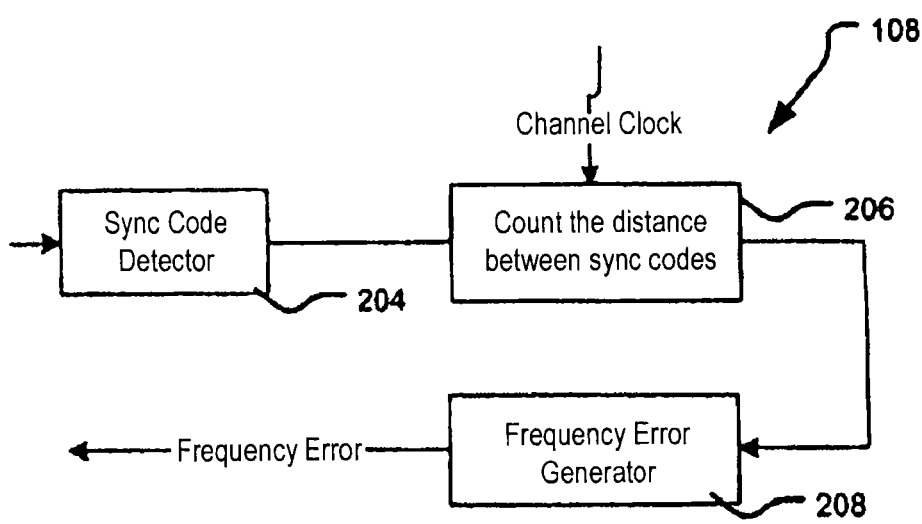
FIG. 2B shows yet another exemplary frequency detector constructed according to the principles of the invention, which may be used in connection with the timing loop circuit shown in FIG. 1.
Figure 3:
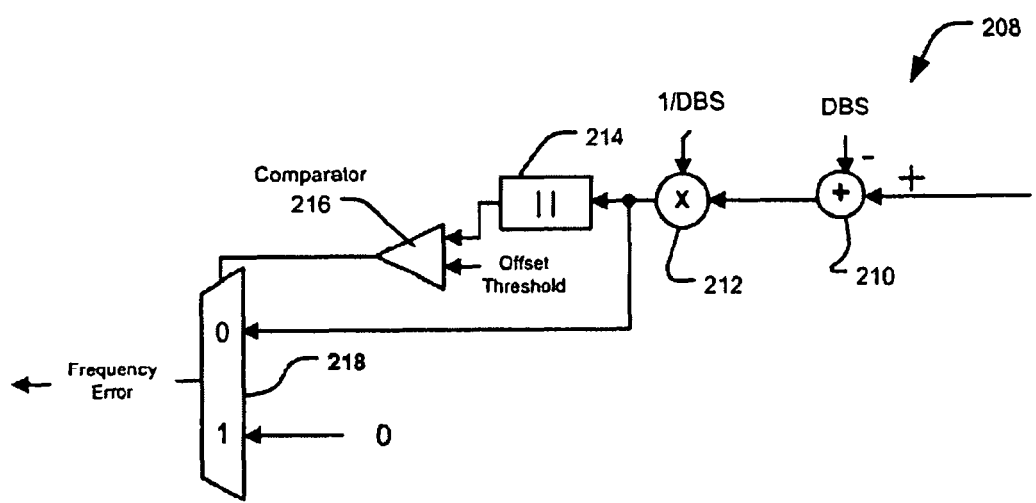
FIG. 3 shows an exemplary frequency error generator constructed according to the principles of the invention, which may be used in the frequency detector of FIG. 2.

FIG. 2B shows yet another exemplary frequency detector constructed according to the principles of the invention, which may be used in connection with the timing loop circuit shown in FIG. 1. In this aspect, the sync codes on the storage media may be detected using a sync detector such as a correlation or matched filter detector. The frequency error generator 208 will now be described in greater detail below in connection with FIG. 3.

The frequency error generator 208 is responsive to the output of counter 206. The output of the frequency error generator 208 is a function of the detected distance between sync codes and the expected distance, in for example clock cycles, between the known occurrences of the sync codes. As described above, different storage formats may have different sync codes, and different distances between the occurrences of the sync codes. The expected distance between sync codes may be programmable, so that the system of the invention may be used with various types of storage formats. The detected and expected distances are combined in the frequency error generator 208. The expected distance between the sync codes may be received by a combiner 210, such as a summer circuit. Combiner 210 subtracts the expected distance (DBS) from the detected distance from counter 206 between the sync codes.

To normalize the difference between the expected distance and the detected distance, and account for the normal distances between the sync codes, the output of combiner 210 is input to combiner 212, such as a multiplier circuit. Combiner 212 multiples the output of combiner 210 by the inverse of the expected distance (1/DBS), or an estimate thereof between the sync codes.

The output of combiner 212 may be input into an absolute value module 214, which converts the signal into an absolute value signal. This absolute value signal may be compared with an offset threshold by a comparator 216. A comparison with the offset threshold may ensure that no clearly erroneous detection signals are used in frequency acquisition. By way of example, an offset threshold may be set so that detected offset amounts in the signal of greater than 50% are ignored. Other threshold values may also be used. The threshold offset may be changed, thereby allowing the system of the invention to be used with various storage formats.

The output of the comparator 216 controls the output of a multiplexer 218. The inputs to the multiplexer 218 are zero (0) and the output of combiner 212. When the absolute value of the output of the combiner 212 is greater than the offset threshold, the multiplexer 218 outputs zero for the frequency offset. When the absolute value of the output of combiner 212 is less than the offset threshold, the multiplexer 218 outputs the value of the output of combiner 212 as the frequency offset.

Figure 3A:
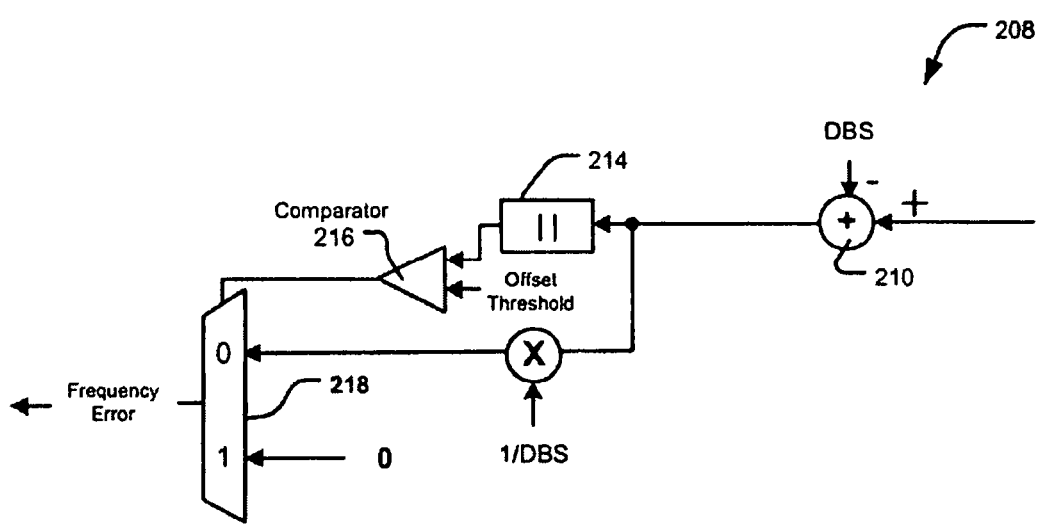
FIG. 3A shows another exemplary frequency error generator constructed according to the principles of the invention, which may be used in the frequency detector of FIG. 2.

FIG. 3A shows another exemplary frequency error generator constructed according to the principles of the invention, which may be used in the frequency detector of FIG. 2. In this aspect, the output of combiner circuit 210 may also be input into an absolute value module 214, which converts the signal into an absolute value signal. This absolute value signal may be compared with an offset threshold by a comparator 216. A comparison with an offset threshold may ensure that no clearly erroneous detection signals are used in frequency acquisition. By way of example, an offset threshold may be set so that detected offset amounts of greater than 50% are ignored. Other threshold values may also be used. The offset amount may be changed, thereby allowing the system of the invention to be used with various storage formats.

Figure 4:
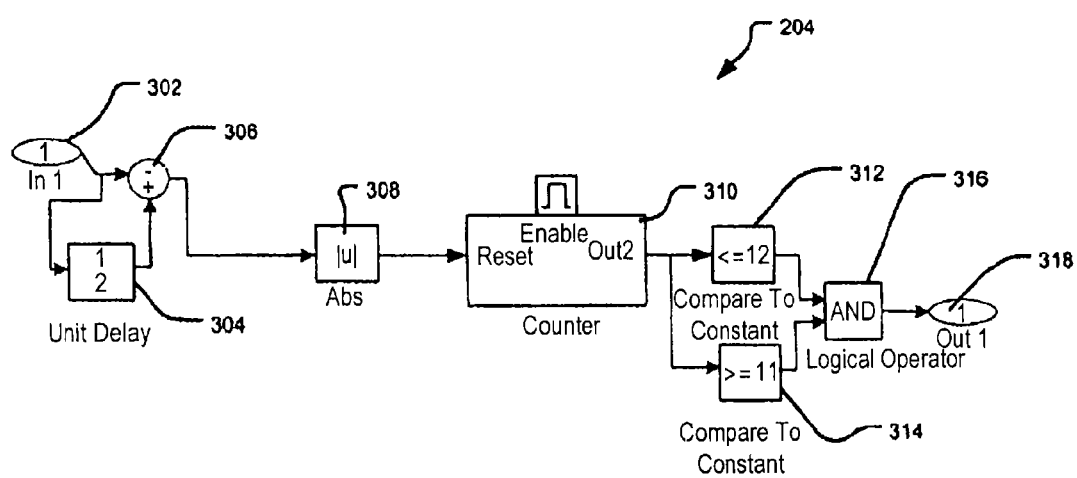
FIG. 4 shows an exemplary sync code detector constructed according to the principles of the invention, which may be used in the frequency detector shown in FIG. 2.

FIG. 4 shows an exemplary structure for a sync code detector 204 constructed according to the principles of the invention, which may be used in the frequency detector shown in FIG. 2. The input 302 to the sync code detector 204 is responsive to sync codes detected at the multiplexer 202. The input signal may be sent through a delay 304, and subtracted from the (non-delayed) input signal at a combiner 306, such as an adding circuit. The output of combiner 306 may be sent to an absolute value module 308, which outputs the absolute value of the signal received from combiner 306.

A counter 310 receives the signal from the absolute value module 308. The counter 310 is enabled by the occurrence of a sync code, and counts the number of clock cycles between each occurrence of the sync code received in the sync code detector 204.

The output of counter 310 may be input into comparators 312 and 314. Each of comparators 312 and 314 has a threshold amount based on the storage format. In the example illustrated in FIG. 4, comparator 312 is set at less than or equal to twelve (12), while comparator 314 is set at greater than or equal to eleven (11). Thus, the comparator 312 outputs a high signal when it receives a signal less than or equal to twelve (12), and comparator 312 outputs a low signal when it receives a signal greater than twelve (12). The comparator 314 outputs a high signal if it receives a signal greater than or equal to eleven (11), and comparator 314 outputs a low signal if it receives a signal less than eleven (11). Comparators 312 and 314 are programmable to allow various storage formats to be used. By way of example, for high definition (HD) DVD storage the nominal comparison range is [11, 12]. For DVD storage, the comparison range is [13, 15]. Other ranges may also be used.

The output of comparators 312 and 314 may be received at an AND gate 316. The signal from the AND gate 316 is output to output 318.

Figure 5:
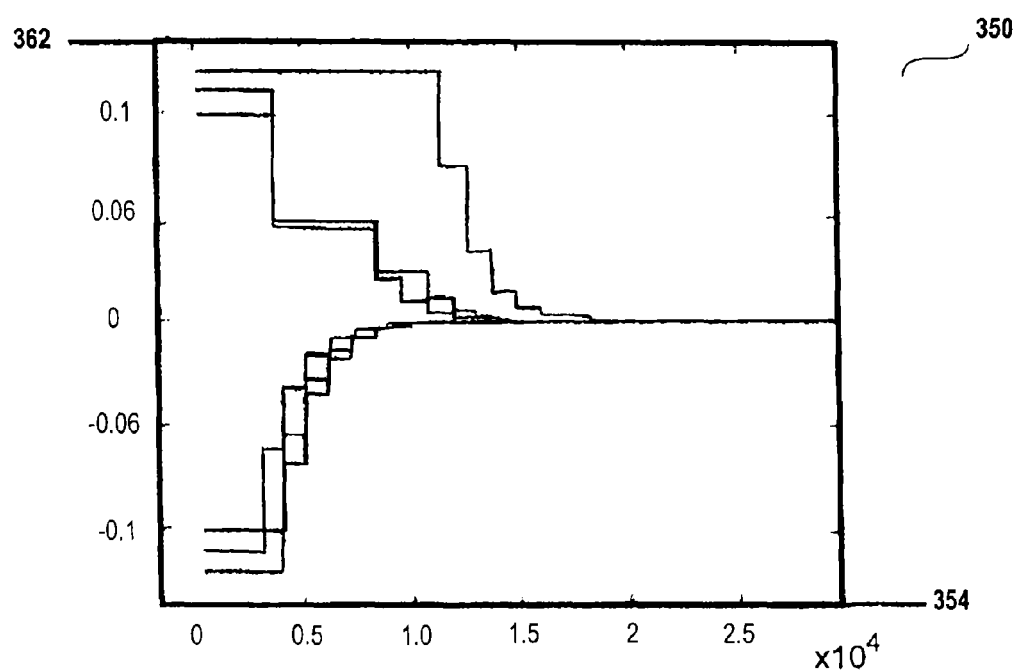
FIG. 5 shows a plot of simulated frequency trajectories resulting from principles of the invention.

FIG. 5 shows simulated frequency trajectories resulting from use of a timing recovery circuit constructed according to the principles of the invention. The graph illustrates a frequency error percentage 352, on the vertical axis, compared to time 354, on the horizontal axis. The simulation was performed using a captured HD waveform with added noise. The noise level is added such that the Viterbi Bit Error Rate (BER) is in the order of 1 e-3. As illustrated, the frequency error percentage decreases over time to zero, at which point there is no error in the detected frequency. FIG. 4 shows a pull-in range of at least 12%. Other pull-in ranges may also be obtained.

Figure 6:
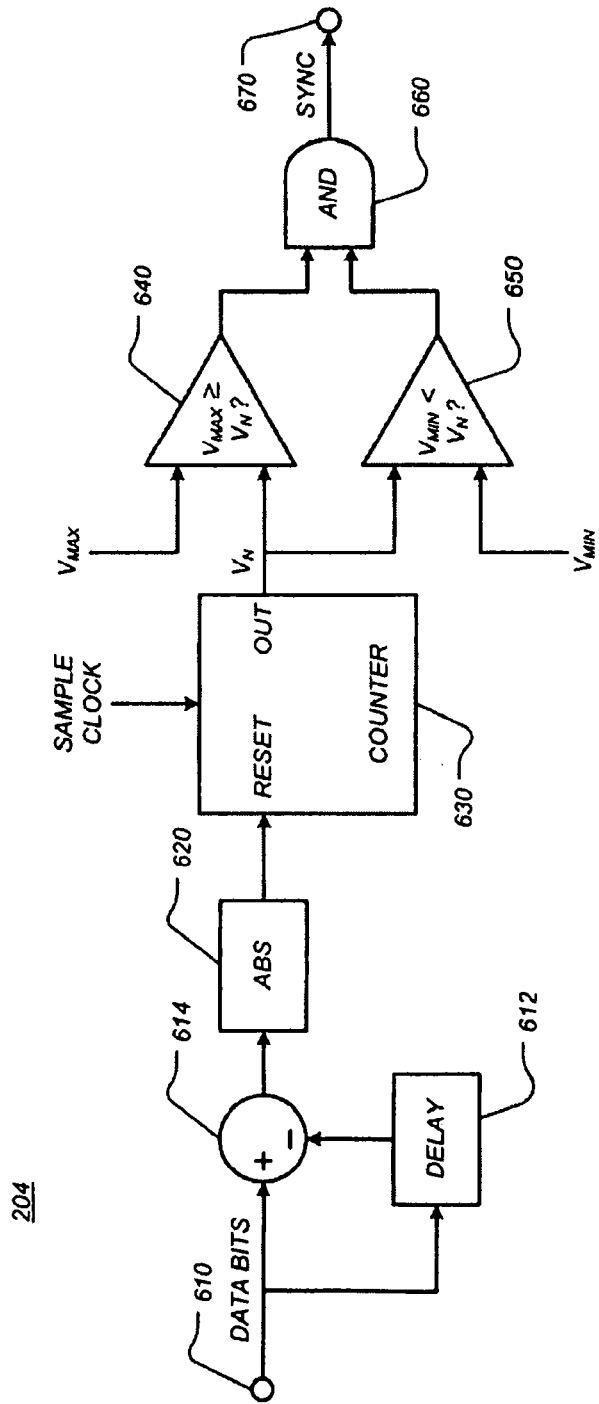
FIG. 6 shows a detailed configuration of the sync mark detector 204 shown in FIG. 4.

FIG. 6 shows a detailed configuration of the sync mark detector 204 shown in FIG. 4. The sync mark detector 204 may include an input terminal 610, a delay 612, a subtractor 614, an absolute value module (ABS) 620, a counter 630, a first comparator 640, a second comparator 650, an AND gate 660, an output terminal 670, and/or the like. The input terminal 610 may be configured to sequentially receive data bits, which may be readout data from an optical storage device, such as, a Compact Disk (CD), a Digital Versatile disk (DVD), a Blu-ray disc, a HD-DVD disc, or the like. The data bits may include a plurality of sync marks (i.e., sync codes) which may be periodically arranged in the data sectors of the optical storage device. The sync mark format may vary depending on the optical storage type. For example, in the DVD data format, the sync mark may be fourteen consecutive bits having the same logic value (e.g., "0" or "1"). Each sync mark may be followed by channel data containing data bits of audio data, video data, text data, control data and/or the like, which may be, for example, but is not limited to 1456 bits long in the DVD data format.

The data bits may include a plurality of constant bit groups, each constant bit group including a plurality of consecutive bits having the same logic value (e.g., "0" or "1"). The bit length of each constant bit group may be larger than two. Some of the constant bit groups may be the sync marks since the sync marks may also include a specific number of consecutive bits having the same logic value, for example, fourteen consecutive bits of "0" or "1" for the DVD data format.

The delay 612 may be, for example, a unit delay which may be configured to delay the data bits by a specific sample period. The delay 612 may be connected to the input terminal 610 to receive the data bits therefrom and may output the data bits to the subtractor 614 with, e.g., one sample cycle delay. The subtractor 614 may be connected to both the input terminal 610 and the delay 612 to receive the data bits from the input terminal 610 and the delayed data bits from the delay 612. Thus, the subtractor 614 may receive the (N)th bit of the data bits from the input terminal 610 and the (N−1)th bit from the delay 612 simultaneously (N may be a series of positive value integer numbers starting from two). For example, the subtractor 614 may receive the second bit of the data bits from the input terminal 610 and the first bit of the data bits from the delay 612 simultaneously.

The subtractor 614 may subtract the logic value of the (N−1)th bit from that of the (N)th bit and may sequentially output the differences therebetween, which may be one of "1," "0" and "−1." More specifically, when the (N−1)th and (N)th bits have the same logic value, for example, when both the (N−1)th and (N)th bits are either "0" or "1", the output from the subtractor 614 may be "0". When the (N−1)th and (N)th bits have different logic values, the subtractor 614 may output either "1" or "−1". The subtractor 614 may sequentially output the differences to the ABS 620, which may sequentially output absolute values of the differences. Consequently, the ABS 620 may output "0" when two consecutive bits have the same logic value and may output "1" when two consecutive bits have different logic values. For example, a constant bit group having a bit length of five may result in four consecutive bits of "0" output from the ABS 620. A fourteen bit long sync mark may result in thirteen consecutive bits of "0" output from the ABS 620. As mentioned above, the ABS 620 may output "1" only when there is a change (difference) in the logic values between two consecutive bits of the data bits. Thus, the sequential bits output from the ABS 620 may be referred to as a bit value change signal.

The counter 630 may be connected to the ABS 620 to receive the bit value change signal therefrom at a RESET input and a sample clock signal at a SAMPLE CLOCK input. The counter 630 may be configured to start a new count when the bit value change signal becomes "1." Then the counter 630 may increment the count per each sample cycle as long as the bit value change signal remains at "0." When the bit value change signal changes from "0" to "1" again, the counter 630 may be reset after outputting the counted number, and may start a new count. The counted number output from the counter 630, which is referred to as a constant bit length value, may be the same with the number of consecutive bits of "0" output from the ABS 620. Thus, when a constant bit group in the data bits is detected, the counter 630 may output a constant bit length value $V_N$ representing the length of the corresponding constant bit group.

In the particular configuration shown in FIG. 6, for example, a constant bit group having seven consecutive bits may result in a constant bit length value of six. Similarly, a fourteen bit long sync mark may result in a constant bit length value of thirteen. Thus, the constant bit length value may be smaller than the actual bit length of the corresponding constant bit group. However, the constant bit length value may be equal to or larger than the actual bit length of the corresponding constant bit group by modifying the configuration of the sync mark detector 204. For example, the sync mark detector 204 may include a sampler (not shown) that may sample each data bit twice per clock cycle such that, for example, a ten bit long constant bit group may be sampled as twenty bits.

The counter 630 may sequentially output the constant bit length values $V_N$ to the comparators 640 and 650 simultaneously. The comparator 640 may compare each constant bit length value $V_N$ to a maximum threshold value $V_{MAX}$ to determine whether the maximum threshold value $V_{MAX}$ is equal to larger than the constant bit length value. Simultaneously, the comparator 650 may compare the same constant bit length value $V_N$ to a minimum threshold value $V_{MIN}$ to determine whether the constant bit length value $V_N$ is larger than the minimum threshold value $V_{MIN}$.

The maximum threshold value $V_{MAX}$ and minimum threshold value $V_{MIN}$ may be determined based on the bit length of the sync mark. For example, in the configuration shown in FIG. 6, a fourteen bit long DVD sync mark was scaled to a constant bit length value $V_N$ of thirteen. In order to detect occurrences of the constant bit length value $V_N$ of thirteen, the maximum threshold value $V_{MAN}$ (may be set to thirteen and the minimum threshold value $V_{MIN}$ may be set to twelve. The comparator 640 may be configured to output "1" only when an individual constant bit length value $V_N$ applied thereto is equal to or smaller than thirteen (i.e., maximum threshold value $V_{MAX}$). In other words, any constant bit length value $V_N$ that is higher than thirteen may cause the comparator 640 to output "0." Also, the comparator 650 may be configured to output "1" when the same constant bit length value $V_N$ is larger than twelve (i.e., minimum threshold value $V_{MIN}$). Any constant bit length value $V_N$ that is equal to or lower than twelve may cause the comparator 650 to output "0."

The outputs from the comparators 640, 650 may be applied to two inputs of the AND gate 660, which may output "1" to the output terminal 670 when the logic values of both inputs are "1." As mentioned above, the comparators 640, 650 may output "1" when an individual constant bit length value $V_N$ applied thereto is larger than the minimum threshold value $V_{MIN}$ and equal to or smaller than the maximum threshold value $V_{MAX}$. When any of the comparators 640, 650 outputs "0," the AND gate 660 may output "0" to the output terminal 670. Thus, the output from frequency detector 204 becomes "1" when a constant bit group in the data bits applied to the input terminal 610 is exactly fourteen bit long, which is the bit length of the DVD sync mark, for example. Accordingly, the output signal from the AND gate 660 may be used as a sync mark detection signal SYNC.

The maximum threshold value $V_{MAX}$ and the minimum threshold value $V_{MIN}$ may be adjusted to detect other types of sync mark having a different bit length. Further, the sync mark detector 204 may be configured such that a user may program the maximum threshold value $V_{MAX}$ and the minimum threshold value $V_{MIN}$. Alternatively, the sync mark detector 204 may be configured to automatically adjust the maximum threshold value $V_{MAX}$ and the minimum threshold value $V_{MIN}$ based on the sync mark format.

Figure 7A:
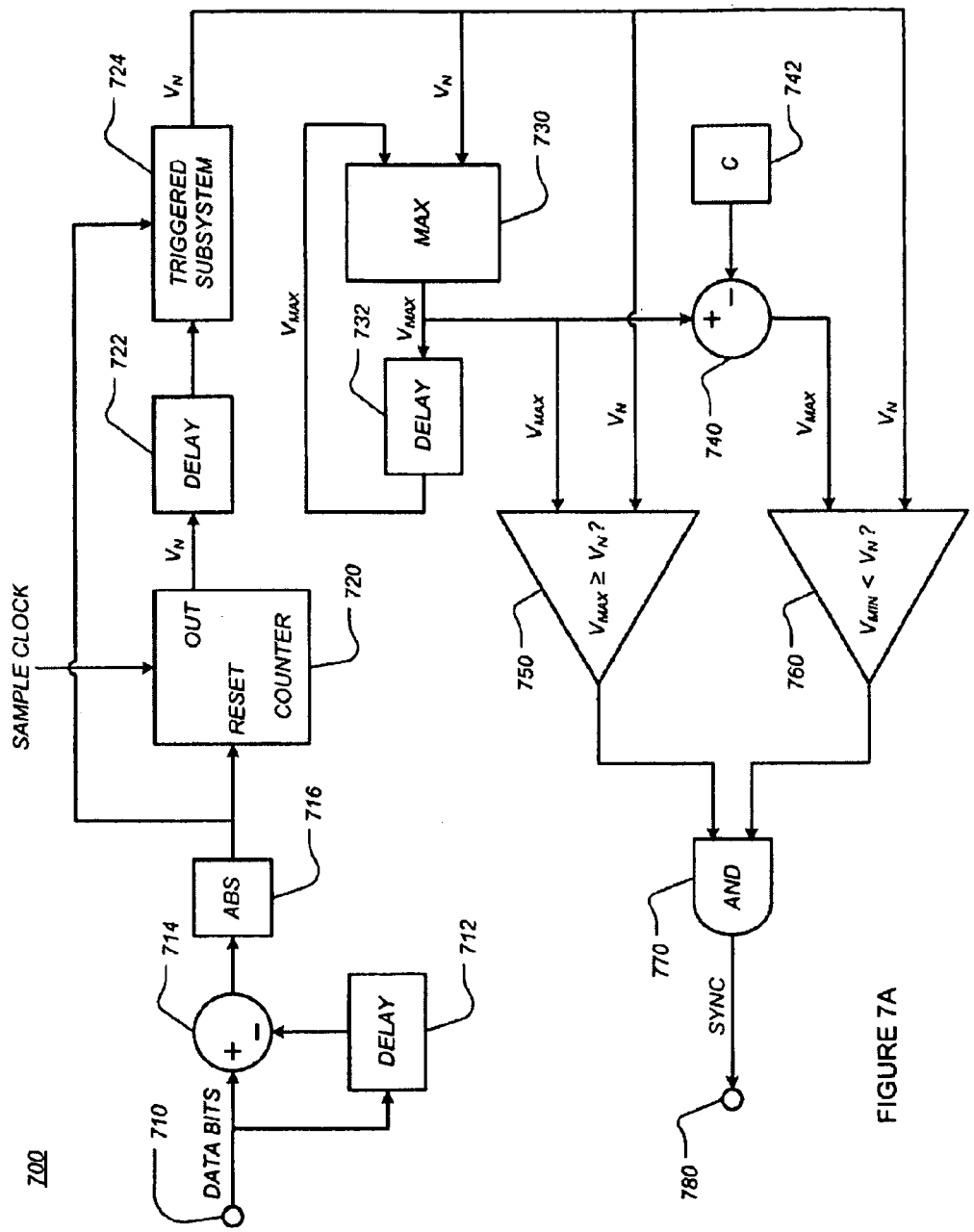
FIG. 7A shows another exemplary sync code detector constructed according to the principles of the invention, which may be used in the frequency detector shown in FIG. 2.

FIG. 7A shows another exemplary sync code detector 700 constructed according to the principle of the invention, which may be used in the frequency detector shown in FIG. 2. The sync mark detector 700 may include an input terminal 710, a delay 712, a subtractor 714, an absolute value module (ABS) 716, a counter 720, a delay 722, a triggered subsystem 724, a max comparator 730, a delay 732, a subtractor 740, a first comparator 750, a second comparator 760, an AND gate 770, an output terminal 780, and/or the like. The operations and interconnections of the input terminal 710, delay 712, subtractor 714, absolute value module (ABS) 716 and counter 720 may be similar to those of the input terminal 610, delay 612, subtractor 614, absolute value module (ABS) 620, and counter 630 of the sync mark detector 204 shown in FIG. 6. For example, the input terminal 710 may receive data bits which may include a plurality of constant bit groups, and the counter 720 may sequentially output constant bit length values $V_N$ representing the bit lengths of the corresponding constant bit groups, respectively.

The delay 722 may be connected to the counter 720 to receive the series of the constant bit length values $V_N$ therefrom. The triggered subsystem 724 may be connected to the delay 722 to receive the series of constant bit length values therefrom. Further, the triggered subsystem 724 may be connected to the ABS 716 to receive a bit value change signal therefrom. Thus, the triggered subsystem 724 may sequentially output a single constant bit length value $V_N$ at a time when the bit value change signal becomes "1." The max comparator 730 may have two inputs; of which one is connected to the triggered subsystem 724 to receive a single constant bit length value $V_N$ at a time therefrom; and the other one of which is connected to the output from the max comparator 730 via the delay 732. With this configuration, the max comparator 730 may output the larger one of two constant bit length values $V_N$ applied thereto and may feed the larger value back to one of its two inputs via the delay 732. Thus, when the (N)th constant bit length value $V_N$ is applied to one input of the comparator 732, the largest one of the previous constant bit length values $V_N$ (e.g., the first to (N−1) th constant bit length values) may be applied to the other input of the max comparator 730 (N is a series of positive value integer numbers, starting from two). Upon completing the comparison, the max comparator 730 may output the largest one of the first to (N)th constant bit length values $V_N$.

When the sync mark is the longest constant bit group in the data bits applied to the sync mark detector 700, it may not be necessary to program the maximum threshold value $V_{MAX}$ because the largest one of the constant bit length values $V_N$ determined by max comparator 730 may represent the bit length of the sync mark. Thus, the largest constant bit length value from the max comparator 730 may be used as the maximum threshold value $V_{MAX}$. The minimum threshold value $V_{MIN}$ may be determined based on the maximum threshold value $V_{MAX}$ and the bit length of the sync mark. For example, when the bit length of a sync mark is fourteen, the maximum threshold value $V_{MAX}$ may be the largest constant bit length value, which may be thirteen for the DVD sync mark in the particular configuration shown in FIG. 7A. This means that any constant bit length value that is equal to or smaller than twelve is not a sync mark. Thus, the minimum threshold value $V_{MIN}$ may be set to twelve, which may be obtained by using the subtractor 740 to subtract an appropriate constant C 742 from the maximum threshold value $V_{MAX}$. For example, the constant C 742 may be one ("1") in the case of the DVD sync mark.

The largest constant bit length value from the max comparator 730 may be applied as the maximum threshold value $V_{MAX}$ to the first comparator 750. Also, the output from the subtractor 740 may be applied as the minimum threshold value $V_{MIN}$ to the second comparator 760. When the triggered subsystem 724 outputs a constant bit length value $V_N$, the max comparator 330 may compare the constant bit length value $V_N$ to the largest previous constant bit length value and output the larger one thereof as the maximum constant bit length value $V_{MAX}$. When the constant bit length value $V_N$ is not larger than the largest previous constant bit length value, no change may be made to the maximum threshold value $V_{MAX}$ and the minimum threshold value $V_{MIN}$. Then, the constant bit length value $V_N$ may be applied to the first and second comparators 750, 760 simultaneously. The first comparator

750 may be configured to output "1" when the maximum threshold value $V_{MAX}$ is equal to or larger than the constant bit length value $V_N$. The second comparator 760 may be configured to output "1" when the constant bit length value $V_N$ is larger than the minimum threshold value $V_{MIN}$. For example, when the sync mark is fourteen bit long, both of the first and second comparators 750, 760 may output "1" when the constant bit length value $V_N$ is thirteen. When both of the first and second comparators 750, 760 output "1," the AND gate 770 may also output "1" to the output terminal 780 in order to indicate that a sync mark has been detected.

In the configuration shown in FIG. 7A, it is possible that the first comparator 750 may continuously output "1" because the constant bit length value $V_N$ may not be larger than the maximum constant bit length value $V_{MAX}$. More specifically, a sync mark may be the very first constant bit group that is detected by the sync mark detector 700. The maximum threshold value $V_{MAX}$ and minimum threshold value $V_{MIN}$ may be automatically determined immediately after the sync mark is detected. Even when the constant bit length value $V_N$ represents a sync mark, the first comparator 750 may output "1" because the constant bit length value $V_N$ and the maximum constant bit length value $V_{MAX}$ may be the same. Thus, it is possible that the first comparator 750 may have no contribution to detecting sync marks in the data bits.

Figure 7B:
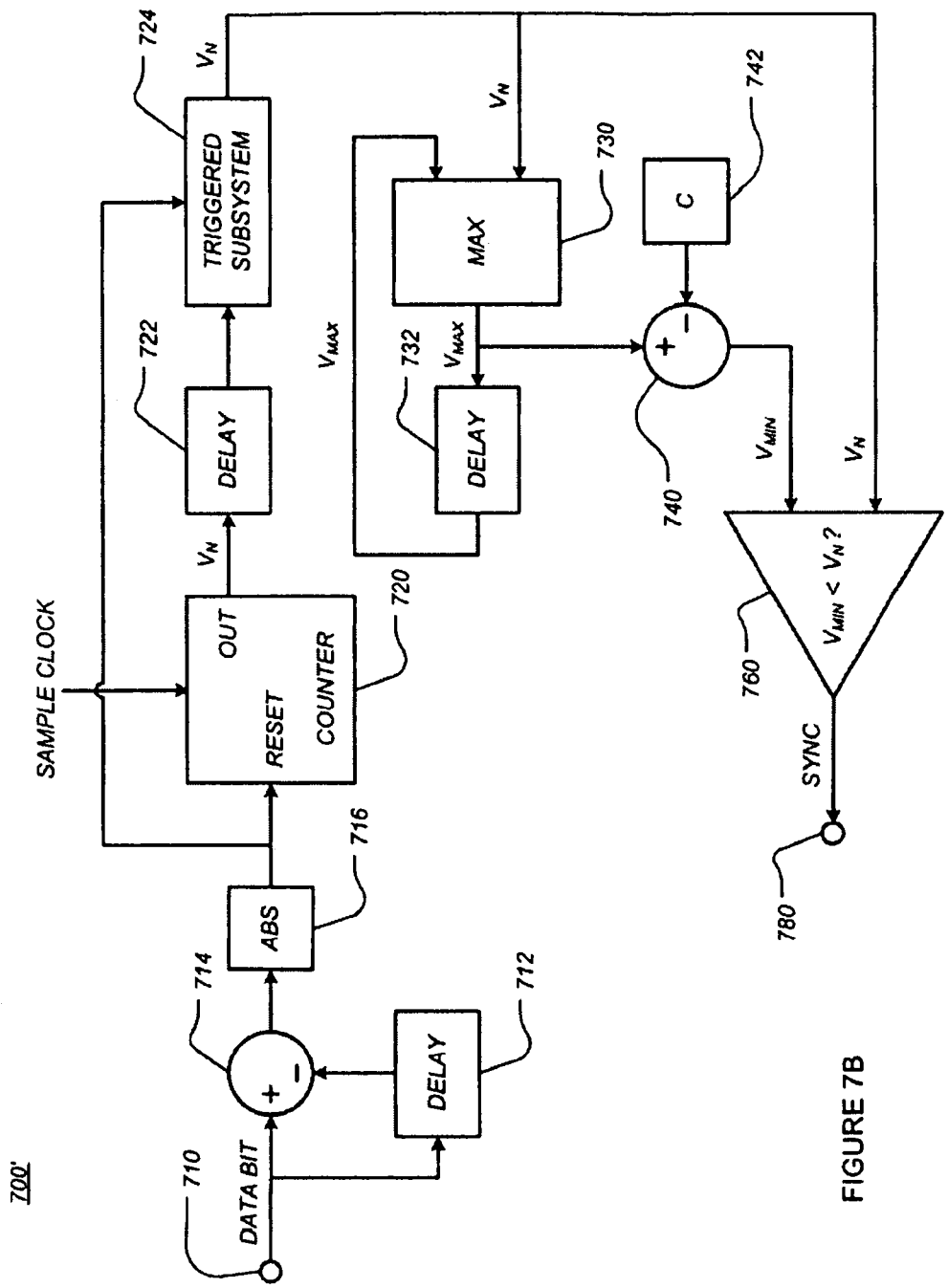
FIG. 7B shows another exemplary sync code detector constructed according to the principles of the invention, which may be modified from the sync code detector shown in FIG. 7A.

FIG. 7B shows another sync mark detector 700', constructed according to the principles of the invention, which may be identical to the sync mark detector 700 shown in FIG. 7A except for the first comparator 750 and the AND gate 770. As mentioned above, the first comparator 750 may not contribute to detecting sync marks because it may always output "1," and, hence, may be removed. When the first comparator 750 is removed, it is no longer necessary to compare the output signals from the first and second comparators 750, 760, and, hence, the AND gate 770 may also be removed. The comparator 760 may compare the constant bit length value $V_N$ to the minimum threshold value $V_{MIN}$ and may output "1" to the output terminal 780 when the constant bit length value $V_N$ is larger than the minimum threshold value $V_{MIN}$. Thus, the sync mark detector 700' may be able to perform the same functions as the sync mark detector 700 shown in FIG. 7B.

As described above, a constant bit length value may be scaled to be larger than the bit length of the corresponding constant bit group. For example, the sync mark detectors 700, 700' may include a sampler (not shown) that may sample each data bit twice per clock cycle such that, for example, a fourteen bit long constant bit group may be sampled as twenty eight bits. Then, the constant bit length value $V_N$ thereof may be twenty seven and the minimum threshold value $V_{MIN}$ may be set to twenty six. With this configuration, the constant bit length value $V_N$ resenting a constant bit group having a bit length of thirteen or smaller may never be larger than twenty five. Thus, more precise detection may be performed.

While sync marks may be generally the longest constant bit group, there may be a constant bit group that is longer than the sync marks. This unusually long constant bit group, referred to as an outlier, may be caused by a media defect. When an outlier is received by the sync mark detector 700' shown in FIG. 7B, the max comparator 730 may output a constant bit length value $V_N$ of the outlier as the maximum threshold value $V_{MAX}$, which may be larger than the constant bit length value $V_N$ of the sync marks. Thus, the outlier may cause failure to detect the sync marks in the sync mark detector 700'.

Figure 7C:
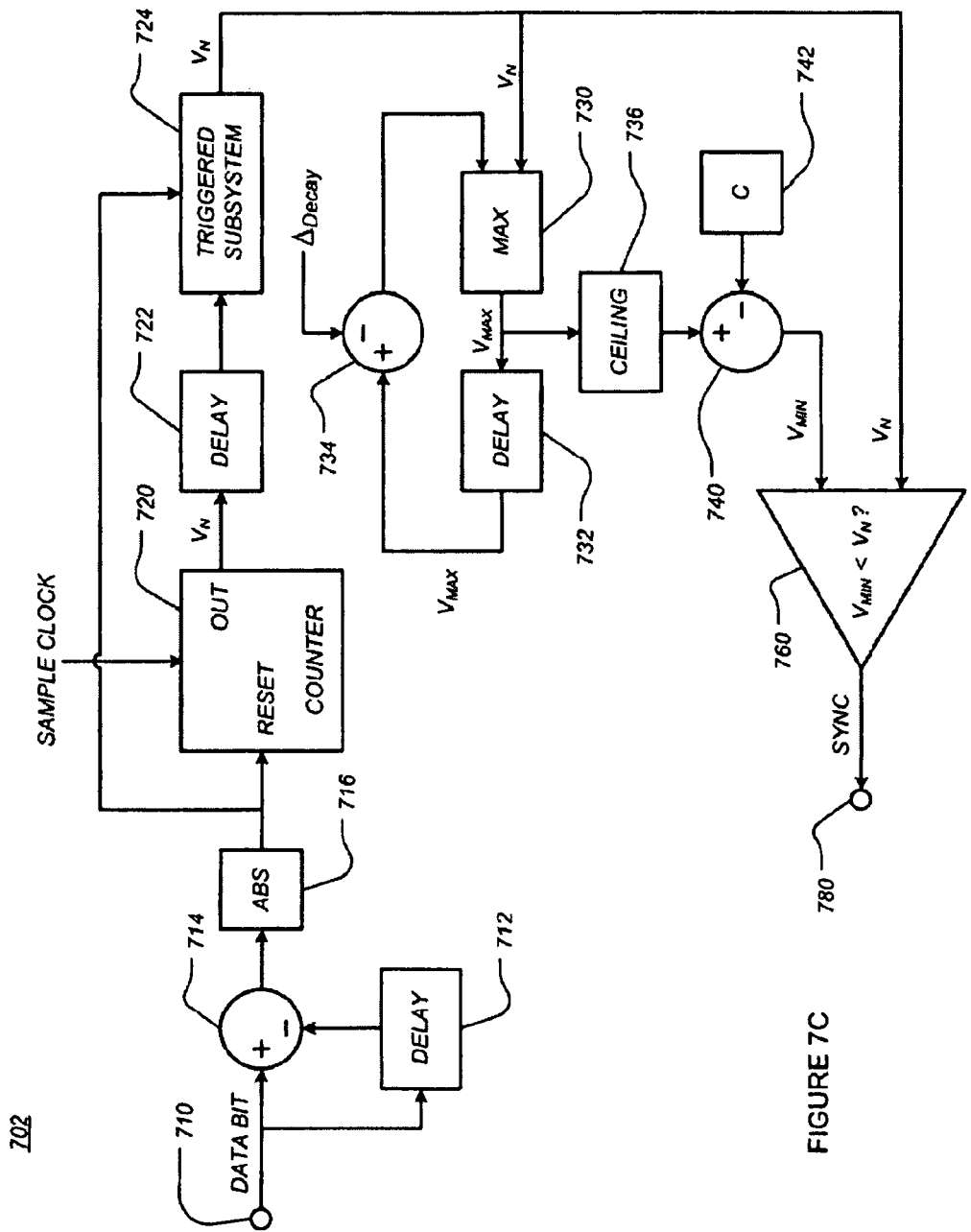
FIG. 7C shows another exemplary sync code detector constructed according to the principles of the invention, which may be modified from the sync code detector shown in FIG. 7B.

FIG. 7C shows another sync mark detector 702, constructed according to the principles of the invention, which may reduce the effect of an outlier. The sync mark detector 702 may include a subtractor 734 and a ceiling unit 736 in addition to the components included in the sync mark detector 700' shown in FIG. 7B. The subtractor 734 may be coupled between the delay 732 and the max comparator 730. The subtractor 734 may be configured to subtract a decay value $\Delta_{Decay}$ from the maximum threshold value $V_{MAX}$ from the delay 732 until a new constant bit length value $V_N$ that is the same as, or larger than the current maximum threshold value $V_{MAX}$ is applied to the max comparator 730. By slowly decaying the maximum threshold value $V_{MAX}$, the constant bit length value $V_N$ of an outlier may be gradually decreased and the effect of an outlier may be reduced.

When a high sampling frequency is used in the sync mark detector 700', a maximum threshold value $V_{MAX}$ may become large. Particularly, when the sampling frequency is closer to optimal, a maximum threshold value $V_{MAX}$ may become excessively large and the sync mark detector 700' may not be able to detect sync marks at all. This problem may also be solved by slowly decaying the maximum threshold value $V_{MAX}$ using, for example, the sync mark detector 702. The decay value $\Delta_{Decay}$ may be sufficiently small such that the maximum threshold value $V_{MAX}$ does not decay radically between two consecutive sync marks.

Additionally or alternatively to the decay function, the sync mark detector 702 may be configured to include a limited slew rate. For example, when a constant bit length value $V_N$ applied to the max comparator 730 is larger than the current maximum threshold value $V_{MAX}$ from the delay 732, the sync mark detector 702 may be configured to set the new maximum threshold value $V_{MAX}$ by adding a small attack value $\Delta_{Attack}$, e.g., a value of one or two, to the current maximum threshold value $V_{MAX}$. This may also reduce the effect of an outlier.

Figure 7D:
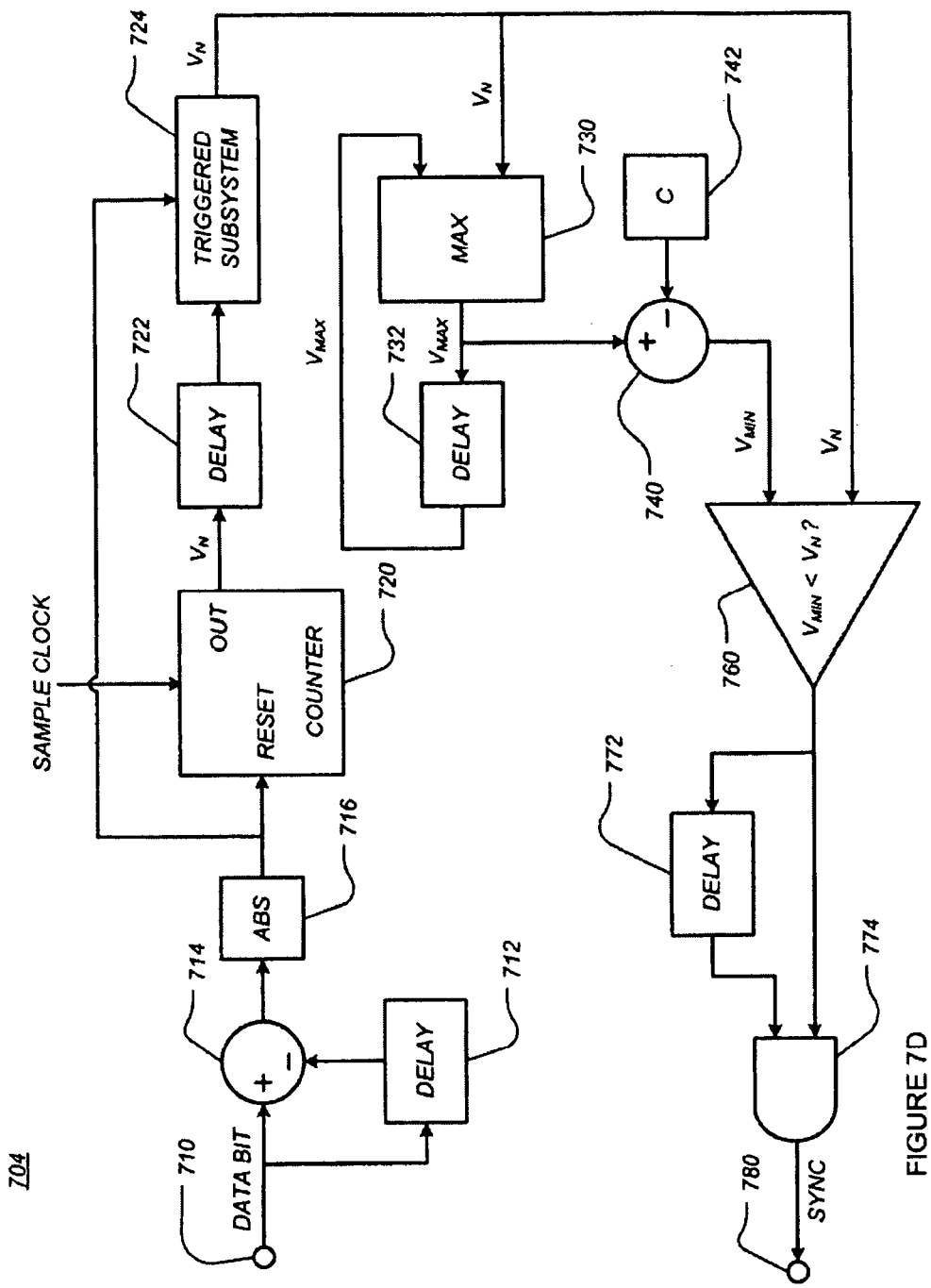
FIG. 7D shows another exemplary sync code detector constructed according to the principles of the invention, which may be modified from the sync code detector shown in FIG. 7B.

FIG. 7D shows another sync mark detector 704, constructed according to the principles of the invention, which may include a delay 772 and an AND gate 774 in addition to the components included in the sync mark detector 700' shown in FIG. 7B. The delay 772 may be coupled between the output of the comparator 760 and an input of the AND gate 774. Another input of the AND gate 774 may be directly connected to the output of the comparator 760. With this configuration, the sync mark detector 704 may be able to detect sync marks with alternating polarities. For example, in the CD format, the sync mark may include eleven consecutive bits of "1" followed by eleven consecutive bits of "0." The order may be reversed and the sync mark may include eleven consecutive bits of "0" followed by eleven consecutive bits of "1." In either case, the comparator 760 may output "1" when the first eleven consecutive bits of "1" (or "0") are processed. Subsequently, the comparator 760 may output another "1" when the second eleven consecutive bits of "0" (or "1") are processed. The first output "1" may be held by the delay 772 and provided to an input of the AND gate 774 when the second output "1" is provided to the other input of the AND gate 774. The AND gate 774 may output "1" to the output terminal 780 only when both inputs are "1." If any of the first and second eleven bits are not a constant bit group, the AND gate 774 may not output "1" to the output terminal 780. Thus, the output from the AND gate 774 may be used as a detection signal for sync marks with alternating polarities.

FIG. 8 shows a process 800 for detecting a sync mark in data bits, according to an embodiment of the invention. Upon starting the process 800 at step 810, the data bits read from an optical disk may be received at step 820. The data bits may include a plurality of constant bit groups, each constant bit group including a plurality of consecutive bits having the same logic value (e.g., "0" or "1"). Then, constant bit length values representing bit lengths of the constant bit groups, respectively, may be determined at step 830, and the largest constant bit length value may be determined at step 840. Based on the largest constant bit length value, a minimum threshold value may be determined at step 850. Subsequently, each constant bit length value may be sequentially compared to the minimum threshold value at step 860. When an individual constant bit length value is larger than the minimum threshold value at step 860, a sync mark detection signal may be output at step 870. When the individual constant bit length value is smaller than or equal to the minimum threshold value at step 860, the process 800 may end at step 880. Thus, according to the invention, a sync mark may be automatically detected without having to provide a bit length range for detection.

In accordance with various embodiments of the invention, the methods described herein are intended for operation with dedicated hardware implementations including, but not limited to, semiconductors, application specific integrated circuits, programmable logic arrays, and other hardware devices constructed to implement the methods and modules described herein. Moreover, various embodiments of the invention described herein are intended for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed is:

1. A method for detecting a data pattern in data bits, comprising:
   receiving a plurality of constant bit groups, each constant bit group comprising a plurality of consecutive data bits of a same logic value;
   detecting a data pattern among the constant bit groups, including:
      determining a constant bit length value that is representative of a length of a constant bit group; and
      outputting a data pattern detection signal when the constant bit length value is larger than a detection threshold value; and
   setting the detection threshold value, including:
      comparing constant bit length values from among the plurality of constant bit groups to a largest previous constant bit length value to determine a largest constant bit length value; and
      determining the detection threshold value based on the largest constant bit length value.

2. The method of claim 1, wherein the determining the constant bit length value comprises counting a number of two consecutive bits having the same logic value in each constant bit group.

3. The method of claim 1, wherein the determining the threshold value comprises subtracting a predetermined value from the largest constant bit length value.

4. The method of claim 3, wherein the predetermined value is determined based on a length of the data pattern.

5. The method of claim 3, wherein the predetermined value is programmable.

6. The method of claim 1, further comprising:
   decaying the largest constant bit length value until a new constant bit length value that is equal to or larger than the largest previous constant bit length value is received.

7. The method of claim 1, wherein the data pattern detection signal is a first data pattern detection signal, the method further comprising:
   outputting a second data pattern detection signal when the first data pattern detection signal is output twice consecutively.

8. A detector comprising:
   an input terminal configured to receive a plurality of constant bit groups, each constant hit group comprising a plurality of consecutive data bits of a same logic value;
   a first unit configured to output a constant bit length value that is representative of a length of a constant bit group;
   a second unit configured to output a data pattern detection signal when the constant hit length value is larger than a detection threshold value; and
   a third unit configured to set the detection threshold value, including a fourth unit configured to compare constant bit length values from among the plurality of constant bit groups to a largest previous constant bit length value to determine a largest constant bit length value and to determine the detection threshold value based on the largest constant bit length value.

9. The detector of claim 8, wherein the first unit comprises:
   a change detector connected to the input terminal and configured to output a bit value change signal when a logic value of an (N)th bit of the data bits is different from that of an (N−1)th bit of the data bits, wherein N is a series of positive value integer numbers starting from two; and
   a counter connected to the change detector and configured to increment a count per clock cycle to generate the constant bit length value and reset the count upon receiving the hit value change signal from the change detector.

10. The detector of claim 9, wherein the change detector comprises:
    a delay module configured to receive the data bits from the input terminal and output the data bits with a delay;
    a subtractor connected to the input terminal and the delay module and configured to subtract the logic value of the (N−1)th bit from that of the (N)th bit; and
    an absolute value module connected to the subtractor and configured to output the bit value change signal when an absolute value of a difference between the logic values of the (N)th and (N−1)th bits is not zero.

11. The detector of claim 9, wherein the first unit further comprises:
    a delay module connected to the counter and configured to output each constant hit length value from the counter with a predetermined delay; and a subsystem connected to the delay module and configured to output each constant bit length value from the delay module upon receiving the bit value change signal from the change detector.

12. The detector of claim 8, wherein the second unit comprises:
   a comparison unit configured to compare each constant bit length value and a largest previous constant bit length value, and output a larger one thereof as a largest constant bit length value; and
   a subtractor connected to the comparison unit and configured to subtract a predetermined value from the largest constant bit length value to determine the threshold value.

13. The detector of claim 12, wherein the comparison unit comprises:
   a comparator configured to receive each constant bit length value from the first unit and the largest previous constant bit length value and output a larger one thereof as the largest constant bit length value; and
   a delay module configured to receive the largest constant bit length value from the comparator and provide the largest constant bit length value to the comparator as the largest previous constant bit length value.

14. The detector of claim 13, wherein the subtractor is a first subtractor, and the comparison unit further comprises a second subtractor connected between the delay module and the comparator to subtract a decay value from the largest constant bit length value from the delay module and output the subtracted largest constant bit length value to the comparator as the largest previous constant bit length value.

15. The detector of claim 14, wherein the second subtractor subtracts the decay value from each largest constant bit length value until the comparator receives a constant bit length value that is equal to or larger than the largest previous constant bit length value.

16. The detector of claim 12, wherein the second unit further comprises a ceiling unit connected between the comparison unit and the subtractor and configured to limit the largest constant bit length value provided to the subtractor.

17. The detector of claim 8, wherein the third unit comprises:
   a comparator configured to receive each constant bit length value from the first unit and the largest constant bit length value from the second unit and output the data pattern detection signal when the constant bit length value is larger than the largest constant bit length value; and
   an output terminal connected to the comparator and configured to output the data pattern detection signal.

18. The detector of claim 8, wherein the data pattern detection signal is a first data pattern detection signal, and the detector further comprises a fourth unit configured to output a second data pattern detection signal when the third unit outputs the first data pattern detection signal twice consecutively.

19. The detector of claim 18, wherein the fourth unit comprises:
   a comparator having a first input node and a second input node, the first input node connected to the third unit to receive the first data pattern detection signal; and
   a delay unit connected between the third unit and the second input node of the comparator and configured to delay transmission of the first data pattern detection signal from the third unit to the comparator,
   wherein the comparator outputs the second data pattern detection signal when both the first input node and second input node receive the first data pattern detection signal from the third unit and the delay unit, respectively.

20. A method of detecting a data pattern in data bits, the data pattern having a predetermined bit length, the method comprising:
   receiving a plurality of constant bit groups, each constant bit group comprising a plurality of consecutive bits having a same logic value;
   detecting a data pattern among the constant bit groups, including:
      comparing length information of a constant bit group to a detection threshold value; and
      generating a detection signal when the length information of the constant bit group is larger than the detection threshold value; and
   setting the detection threshold value, including:
      comparing length information of constant bit groups from among the plurality of constant bit groups to that of a longest previous constant bit group to determine length information of a longest constant bit group; and
      determining the detection threshold value based on the length information of the longest constant bit group.

* * * * *